(12) United States Patent
Koji et al.

(10) Patent No.: US 8,262,791 B2
(45) Date of Patent: Sep. 11, 2012

(54) COLORING PARTICLES

(75) Inventors: Shinnosuke Koji, Kawasaki (JP);
Kazumichi Nakahama, Tokyo (JP);
Shoji Koike, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/075,084

(22) Filed: Mar. 29, 2011

(65) Prior Publication Data
US 2011/0239901 A1    Oct. 6, 2011

(30) Foreign Application Priority Data
Mar. 30, 2010    (WO) .................. PCT/JP2010/055697

(51) Int. Cl.
*C09D 11/00*    (2006.01)
*C09B 63/00*    (2006.01)
(52) U.S. Cl. ..................................... 106/31.65; 106/402
(58) Field of Classification Search ............... 106/31.65, 106/402
See application file for complete search history.

(56) References Cited

U.S. PATENT DOCUMENTS

| | | | | |
|---|---|---|---|---|
| 4,167,422 A | * | 9/1979 | Bellanca et al. | 106/402 |
| 4,769,079 A | * | 9/1988 | Clark et al. | 106/402 |
| 5,882,394 A | * | 3/1999 | Sugamo et al. | 106/402 |
| 2002/0025994 A1 | * | 2/2002 | Ishizuka et al. | 523/160 |
| 2003/0193554 A1 | * | 10/2003 | Bullock et al. | 347/100 |
| 2005/0261395 A1 | * | 11/2005 | Ishizuka et al. | 523/160 |
| 2006/0167136 A1 | * | 7/2006 | Kaneko et al. | 523/160 |
| 2007/0065743 A1 | * | 3/2007 | Huang et al. | 430/108.2 |
| 2008/0036830 A1 | * | 2/2008 | Natori et al. | 347/86 |
| 2011/0054094 A1 | * | 3/2011 | Nakahama et al. | 524/186 |
| 2011/0239901 A1 | * | 10/2011 | Koji et al. | 106/31.65 |

FOREIGN PATENT DOCUMENTS

| | | |
|---|---|---|
| JP | 56-166274 A | 12/1981 |
| JP | 3-139575 A | 6/1991 |
| JP | 5-112732 A | 5/1993 |
| JP | 8-302229 A | 11/1996 |
| JP | 2001-131213 A | 5/2001 |
| JP | 2005-60506 A | 3/2005 |
| JP | 2006-160784 A | 6/2006 |
| WO | 01/88046 A2 | 11/2001 |

* cited by examiner

*Primary Examiner* — Melvin C Mayes
*Assistant Examiner* — Veronica F Faison
(74) *Attorney, Agent, or Firm* — Canon U.S.A., Inc., IP Division

(57) ABSTRACT

The present invention provides coloring particles containing a dye and a water-insoluble low-molecular-weight dispersant, wherein the average particle size of the coloring particles is 10 nm or more and 80 nm or less; the solubility parameter of the dye in water with a pH of 6.0 to 10.0 is 9.20 or more, the solubility parameter being represented by formula (1); and the content of the dye and the content of the water-insoluble low-molecular-weight dispersant satisfy a relationship of formula (2).

6 Claims, 1 Drawing Sheet

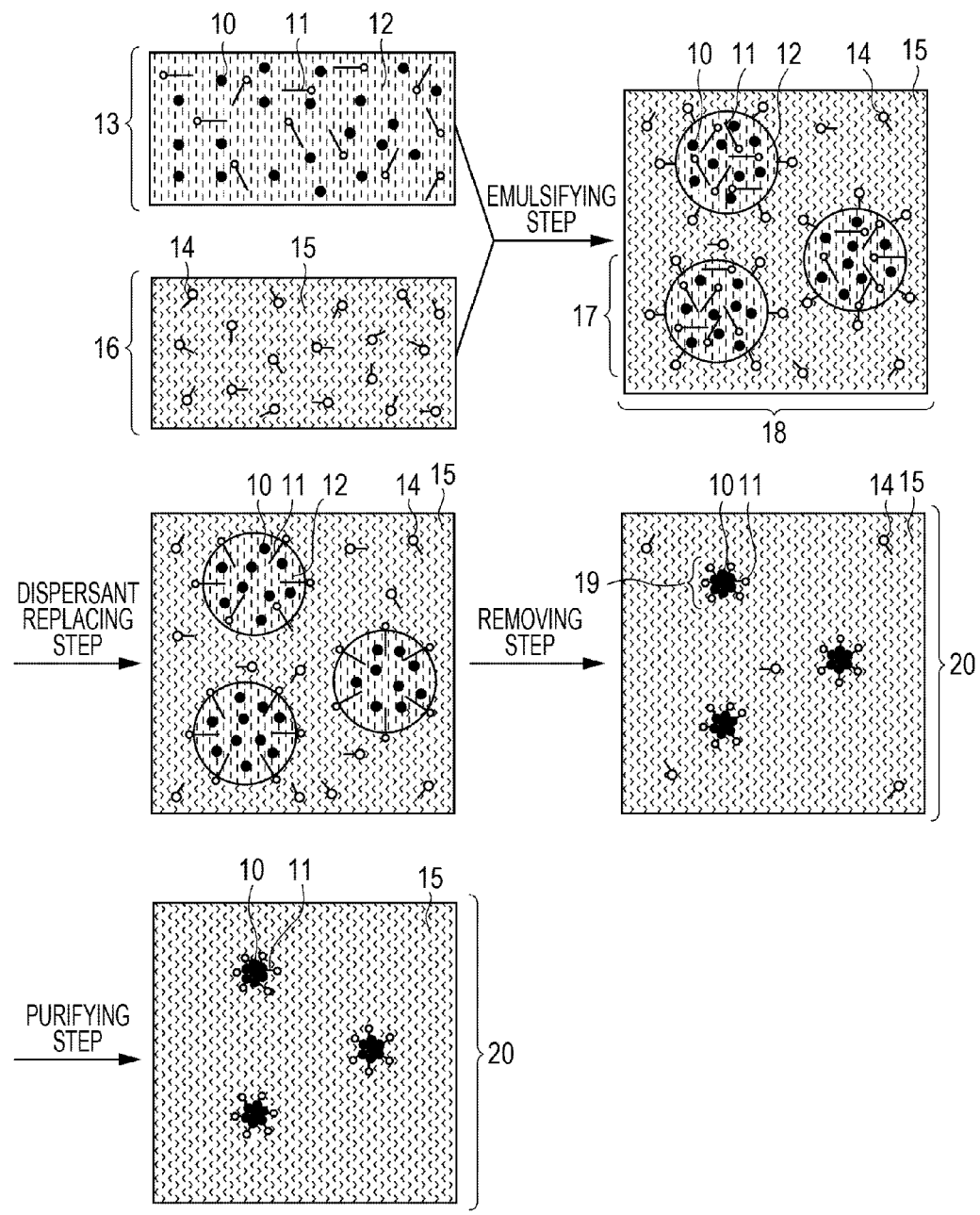

US 8,262,791 B2

COLORING PARTICLES

TECHNICAL FIELD

The present invention relates to coloring particles.

BACKGROUND ART

In the case where a recorded image is formed by applying an ink containing coloring particles such as a pigment to a recording medium, if the coloring particles are finely pulverized particles, light scattering on the recording medium caused by the coloring particles can be suppressed. Therefore, the image density of the recorded image can be favorably increased along with an increase in the content of the coloring particles in an ink solution. Furthermore, fine coloring particles are easily densely filled into pores that are present in the fiber and ink receiving layer of the recording medium and have a physical interaction with the pores. Thus, the recorded image has good scratch resistance.

There has been, as means for pulverizing coloring particles, a mechanical method that uses a dispersing machine such as a sand mill, a roll mill, or a ball mill (refer to PTLs 1 and 2).

CITATION LIST

Patent Literature
PTL 1: Japanese Patent Laid-Open No. 05-112732
PTL 2: Japanese Patent Laid-Open No. 08-302229

However, in the mechanical pulverizing methods disclosed in PTLs 1 and 2, the reaggregation of coloring particles is caused because of excessive dispersion and thus the limitation of the particle size in pulverization is about 90 nm. In addition, an attempt to perform further pulverization by these methods requires an enormous amount of processing time and electrical power and thus is not practical in terms of production cost. There is also a problem in that the monodispersibility of coloring particles is impaired by mechanically pulverizing the coloring particles.

Accordingly, an object of the present invention is to provide fine coloring particles having good monodispersibility.

SUMMARY OF INVENTION

The object of the present invention is achieved by the following configuration. That is, the present invention provides coloring particles containing a dye and a water-insoluble low-molecular-weight dispersant, wherein the average particle size of the coloring particles is 10 nm or more and 80 nm or less; the solubility parameter of the dye in water with a pH of 6.0 to 10.0 is 9.20 or more, the solubility parameter being represented by formula (1) below; and the content of the dye and the content of the water-insoluble low-molecular-weight dispersant satisfy a relationship of formula (2) below on a mass basis.

Solubility parameter=log(1/(aqueous solubility of dye <mol/L>))  Formula (1)

3/2≦(Content of dye in coloring particles)/(Content of water-insoluble low-molecular-weight dispersant in coloring particles)  Formula (2)

Further features of the present invention will become apparent from the following description of exemplary embodiments with reference to the attached drawing.

BRIEF DESCRIPTION OF DRAWINGS

The FIGURE is a diagram showing a method for producing coloring particles of the present invention.

DESCRIPTION OF EMBODIMENTS

A formation mechanism of coloring particles according to aspects of the present invention will be described with reference to FIGURE. In the FIGURE, a first liquid 13 is in a state in which a dye 10 and a water-insoluble low-molecular-weight dispersant 11 are mixed in an oil-based solvent 12. Herein, to obtain intended coloring particles, the dye 10 and the water-insoluble low-molecular-weight dispersant 11 may be dissolved in the oil-based solvent 12. A second liquid 16 is in a state in which a water-soluble dispersant 14 is dissolved in a water-based solvent 15. Next, in an emulsifying step, the first liquid 13 and the second liquid 16 are emulsified through the water-soluble dispersant 14 to prepare an emulsion 18 having dispersoids (first dispersoids 17) composed of the first liquid 13. The first dispersoids 17 contain the dye 10, the water-insoluble low-molecular-weight dispersant 11, and the oil-based solvent 12 and are dispersed in the water-based solvent 15 using the water-soluble dispersant 14. Subsequently, in a dispersant replacing step, the dispersibility of the first dispersoids 17 is stabilized by desorbing the water-soluble dispersant 14 that is adsorbing to the surfaces of the first dispersoids 17 and by adsorbing the water-insoluble low-molecular-weight dispersant 11 to the surfaces of the first dispersoids 17. After that, in a removing step, the oil-based solvent 12 is removed from the first dispersoids 17 to cause spherical aggregation of the dye 10, thereby forming second dispersoids 19 having a structure in which the dispersibility of the spherical aggregates of the dye 10 is stabilized by the water-insoluble dispersant 11. The coloring particles according to aspects of the present invention are the second dispersoids 19. Although not essential according to aspects of the present invention, a purifying step of removing an unnecessary water-soluble dispersant 14 may be performed after the removing step. In the purifying step, impurities (not shown) such as evaporation residues, which may have been produced in the removing step, may be removed. As a result, an ink composition 20 containing the second dispersoids (coloring particles) 19 is obtained.

The specific operation procedure of each of the steps will now be described.

The emulsifying step according to aspects of the present invention is a step of emulsifying the first liquid 13 in the second liquid 16 using a publicly known stirring/shearing machine based on imparting of mechanical energy, such as a high shear homomixer, an ultrasonic homogenizer, a high pressure homogenizer, or a thin-film spin high speed mixer. Among them, an ultrasonic homogenizer, a high pressure homogenizer, or a thin-film spin high speed mixer may be used. The emulsifying step according to aspects of the present invention can be achieved by an emulsification method based on interfacial chemical mechanism, such as membrane emulsification that uses an SPG membrane or microchannel emulsification or microchannel-branched emulsification that uses a microreactor. These methods can be used alone or in combination. This emulsifying step may be performed in a single stage or multiple stages as long as objects according to aspects of the present invention can be achieved.

In the dispersant replacing step according to aspects of the present invention, the water-soluble dispersant 14 that is adsorbing to the surfaces of the first dispersoids 17 is desorbed in the emulsion 18 (hereinafter referred to as a desorbing process). Through this desorbing process, an interfacial energy generated at the contact surface between the oil-based solvent 12 in the first dispersoids 17 and the water-based solvent 15 is increased, thereby destabilizing the dispersibility of the first dispersoids 17. To compensate for the amount of the interfacial energy increased, the water-insoluble low-molecular-weight dispersant 11 spontaneously adsorbs to the surfaces of the first dispersoids 17. The dispersibility of the first dispersoids 17 to which the water-insoluble low-molecular-weight dispersant 11 has adsorbed in such a manner is stabilized in the water-based solvent 15 on the basis of the electrostatic repulsion derived from the water-insoluble low-molecular-weight dispersant 11 or an excluded volume effect. In addition to dilution, static dialysis that uses a semipermeable membrane, and the like, the desorbing process according to aspects of the present invention can be achieved by decreasing the concentration of the water-soluble dispersant 14 in the emulsion 18 using a publicly known dialysis machine such as an ultrafiltration machine. The desorbing process can also be achieved by changing the pH of the emulsion 18 through the addition of a publicly known acid reagent such as hydrochloric acid or a publicly known base reagent such as sodium hydroxide and thus increasing the critical micelle concentration of the water-soluble dispersant 14. The replacement of the dispersants can be confirmed by measuring the zeta potentials of the first dispersoids 17 before and after the desorbing process. Zeta potential can be measured with a publicly known measurement device such as ZEECOM (available from MICROTEC Co., Ltd.) or ELS 8000 (available from Otsuka Electronics Co., Ltd.). However, the measurement of zeta potential is not limited thereto as long as objects according to aspects of the present invention can be achieved.

In the removing step according to aspects of the present invention, any publicly known process can be utilized as long as objects according to aspects of the present invention can be achieved. However, in view of throughput, a pressure-reducing process, a dialysis process, or the combination thereof may be utilized. In the case where a pressure-reducing process is employed in the removing step, a publicly known pressure-reducing machine such as an evaporator can be used. In the case where a dialysis process is employed in the removing step, a publicly known dialysis machine such as an ultrafiltration machine can be used in addition to static dialysis that uses a semipermeable membrane.

In the purifying step according to aspects of the present invention, any publicly known process can be employed as long as objects according to aspects of the present invention can be achieved. However, static dialysis using a semipermeable membrane or a dialysis process that uses a dialysis machine such as an ultrafiltration machine may be employed. In the case where a dialysis process is employed in the removing step, the removing step and the purifying step can be simultaneously performed.

The oil-based solvent according to aspects of the present invention has low solubility in the water-based solvent according to aspects of the present invention and is an organic solvent that forms an interface when mixed with the water-based solvent. The solubility of the oil-based solvent in the water-based solvent may be 3% or less by mass at room temperature (20° C.). By meeting this condition, an emulsion can be satisfactorily formed in the emulsifying step. By using, as the oil-based solvent, a volatile organic solvent having a boiling point lower than that of the water-based solvent, the oil-based solvent can be satisfactorily removed from the dispersoids in the emulsion in the removing step. The oil-based solvent may be an organic solvent that dissolves the dye according to aspects of the present invention in an amount of 1% or more by mass at room temperature (20° C.). Examples of the organic solvent serving as the oil-based solvent include halogenated hydrocarbons (e.g., dichloromethane, chloroform, chloroethane, dichloroethane, trichloroethane, and carbon tetrachloride), ketones (e.g., acetone, methyl ethyl ketone, and methyl isobutyl ketone), ethers (e.g., tetrahydrofuran, ethyl ether, and isobutyl ether), esters (e.g., ethyl acetate and butyl acetate), and aromatic hydrocarbons (e.g., benzene, toluene, and xylene).

The water-based solvent according to aspects of the present invention contains water as an essential component and the content of water is 50% or more by mass. The water-based solvent may be a solvent obtained by adding a dispersant or a water-based organic solvent to water. The water-based solvent may be composed of water whose pH is adjusted using a publicly known acid reagent or base reagent. When the water-based solvent satisfies the above-described conditions, an emulsion can be satisfactorily formed in the emulsifying step.

According to aspects of the present invention, by incorporating the water-soluble dispersant in the water-based solvent, a satisfactory emulsion can be formed. The solubility of the water-soluble dispersant according to aspects of the present invention in the water-based solvent may be more than 0.3% by mass at room temperature (20° C.) In particular, a low-molecular-weight water-soluble dispersant having a molecular weight of 1000 or less may be used as the water-soluble dispersant. If a high-molecular-weight water-soluble dispersant having a molecular weight of more than 1000 is used, the viscosity of the water-based solvent is increased, which may cause difficulties in formation of emulsion in the emulsifying step. In addition, a high-molecular-weight dispersant whose adsorption mode is multipoint adsorption normally has a large adsorption power compared with a low-molecular-weight dispersant whose adsorption mode is single-point adsorption. Thus, if a high-molecular-weight water-soluble dispersant is used, the efficiency of the dispersant replacing step may be decreased. A publicly known anionic dispersant, cationic dispersant, or nonionic dispersant or the like is exemplified as the water-soluble dispersant. Examples of the anionic dispersant include dodecylbenzenesulfonate, decylbenzenesulfonate, undecylbenzenesulfonate, tridecylbenzenesulfonate, nonylbenzenesulfonate, and sodium salts, potassium salts, and ammonium salts of the foregoing. Examples of the cationic dispersant include cetyltrimethylammonium bromide, hexadecylpyridinium chloride, and hexadecyltrimethylammonium chloride. An example of the nonionic dispersant includes oxyethylene-based alkyl ethers.

The emulsion according to aspects of the present invention contains dispersoids including a dye, a water-insoluble low-molecular-weight dispersant, and an oil-based solvent. The average particle size (scattering particle size) based on the dynamic light scattering of the dispersoids may be 10 nm or more and 1000 nm or less. Dispersoids whose particle size distribution substantially have a single peak may be provided because the monodispersibility of intended coloring particles is significantly improved.

According to aspects of the present invention, the oil-based solvent may contain a hydrophobe that is soluble (solubility of at least 3% or more by mass at room temperature (20° C.)) in an oil-based solvent and has a solubility of 0.01 g/L or less in a water-based solvent. This easily stabilizes the emulsion. Examples of the hydrophobe include straight chain, branched chain, and cyclic alkanes with 8 to 30 carbon atoms such as hexadecane, squalane, and cyclooctane; alkyl acrylates with 8 to 30 carbon atoms such as stearyl methacrylate and dodecyl methacrylate; alkyl alcohols with 8 to 30 carbon atoms such as cetyl alcohol; alkyl thiols with 8 to 30 carbon atoms such as decyl mercaptan; polymers such as polyurethane, polyester, and polystyrene; long-chain aliphatic or aromatic carboxylic acids; long-chain aliphatic or aromatic carboxylic acid esters; and long-chain aliphatic or aromatic amines, ketones, halogenated alkanes, silanes, siloxanes, and isocyanates. Among them, alkanes with 12 to 20 carbon atoms may be provided.

According to aspects of the present invention, when a hydrophobic dye having a solubility parameter of 9.20 or more in water with a pH of 6.0 or more and 10.0 or less, the solubility parameter being represented by formula (1) below, is used as the dye, a stable emulsion can be formed. It is believed that the dye having a solubility parameter of 9.20 or more according to aspects of the present invention stabilizes an emulsion with the same mechanism as that of a hydrophobe and contributes to the improvement in the monodispersibility of intended coloring particles.

$$\text{Solubility parameter} = \log(1/(\text{Aqueous solubility of dye} <\text{mol/L}>)) \quad \text{Formula (1)}$$

According to aspects of the present invention, the content of a dye in coloring particles and the content of a water-insoluble low-molecular-weight dispersant in coloring particles satisfy the relationship of formula (2) below.

$$3/2 \leq (\text{Content of dye in coloring particles})/(\text{Content of water-insoluble low-molecular-weight dispersant in coloring particles}) \quad \text{Formula (2)}$$

The (Content of dye in coloring particles)/(Content of water-insoluble low-molecular-weight dispersant in coloring particles) may be 7/3 or more and 9/1 or less. If the value is less than 3/2, the image density of a recorded image obtained when an ink is applied to a recording medium tends to become insufficient. This is because a water-insoluble low-molecular-weight dispersant that substantially does not contribute to color development is excessively present relative to a dye. If the value is more than 9/1, sufficient dispersion stability in the form of a water-based ink sometimes cannot be achieved.

The configuration of the coloring particles according to aspects of the present invention will now be specifically described.

The coloring particles according to aspects of the present invention have an average particle size in water of 10 nm or more and 80 nm or less and even 50 nm or less. In this range, when an image is formed on a recording medium, the light scattering caused by coloring particles is suppressed and thus the image density can be increased. Furthermore, the coloring particles physically interact with pores that are present in the fiber and ink receiving layer of the recording medium and thus the scratch resistance can be improved. If the average particle size is less than 10 nm, the light resistance and gas resistance of an image formed on a recording medium tend to be degraded. If the average particle size is more than 80 nm, the image density of an image formed on a recording medium tends to be decreased due to light scattering or the scratch resistance of the image tends to be degraded. The average particle size of the coloring particles according to aspects of the present invention is a scattering particle size measured in water by dynamic light scattering. An example of a particle size measurement device that uses dynamic light scattering is DLS 8000 (available from Otsuka Electronics Co., Ltd.).

According to aspects of the present invention, the coefficient of variation in the particle size of the coloring particles is may be 60% or less, such as 50% or less, and even 40% or less. If the coefficient of variation is more than 60%, the dispersion stability in the form of a water-based ink is degraded and thus the storage stability and discharge stability may be degraded. Moreover, if the coefficient of variation is more than 60%, when an image is formed on a recording medium, the filling factor of the coloring particles in pores of the fiber and ink receiving layer of the recording medium is decreased and the interaction of the coloring particles with the pores is not easily generated, whereby the scratch resistance tends to be degraded.

The coefficient of variation in the average particle size of the coloring particles according to aspects of the present invention is calculated from the average particle size of the coloring particles and the standard deviation thereof using formula (3) below. The calculation of the coefficient of variation can be applied to the average particle sizes both in a dry state and in water.

$$\text{Coefficient of variation} <\%> = ((\text{Standard deviation of particle size of coloring particles})/(\text{Average particle size of coloring particles})) \times 100 \quad \text{Formula (3)}$$

The average aspect ratio of the coloring particles according to aspects of the present invention is an average aspect ratio (major axis/minor axis) based on the number of dispersoids of the coloring particles, that is, the number of color material particles composed of a dye. The coloring particles according to aspects of the present invention may have an average aspect ratio of 1.00 or more and 1.20 or less to achieve high sphericity. Since such coloring particles exhibit good flowability when being used as a water-based ink, advantageous discharge characteristics are achieved. The average aspect ratio according to aspects of the present invention is obtained by measuring the major axes and minor axes of 1000 or more of coloring particles obtained from an observation image using a scanning electron microscope (SEM) or a transmission electron microscope (TEM) and then by calculating the number average of the values.

The dye contained in the coloring particles according to aspects of the present invention has a solubility parameter of 9.20 or more in water with a pH of 6.0 to 10.0, the solubility parameter being represented by formula (1). According to aspects of the present invention, to obtain intended fine coloring particles with good monodispersibility, the solubility of the dye in water contained in the water-based solvent may be low. In the solubility parameter represented by formula (1), the aqueous solubility of a dye is increased as the value is decreased and the aqueous solubility is decreased as the value is increased. The inventors of the present invention have found that, in the case where the solubility parameter is less than 9.20, the association force of the dye is insufficient and the coloring particles are not stably formed, whereby objects according to aspects of the present invention are not achieved. This may be because, in the case where the solubility parameter is less than 9.20, the dye that is slightly dissolved in water affects the dispersion stability of the coloring particles.

The solubility parameter of a dye may vary depending on the pH of water. Thus, the pH of water is adjusted by a publicly known method so that the solubility parameter of the dye is 9.20 or more. Herein, the maximum range of a change in the pH of water in the preparation of an ink composition is 6.0 to 10.0. Therefore, the coloring particles can be stably formed as long as the solubility parameter of the dye is constantly 9.20 or more when the pH of water is 6.0 to 10.0.

The solubility parameter according to aspects of the present invention can be calculated by measuring the solubility (mol/L) of a dye in water using a publicly known experimental method and then substituting the value in formula (1). The solubility parameter according to aspects of the present invention may be calculated by substituting the solubility (mol/L) of a dye in water in formula (1), the solubility being calculated with ACD/Structure Design Suite (available from FUJITSU LIMITED). Obviously, the aqueous solubility in formula (1) is a solubility in water with a pH of 6.0 to 10.0. The inventors according to aspects of the present invention have confirmed that the thus-calculated solubility parameter agrees with the experimental result to a high degree. Regarding a metal complex colorant, a salt-forming dye, or the like, the solubility is calculated with ACD/Structure Design Suite while a metal or a salt is excluded, and the solubility parameter is calculated based on the value.

As long as the description above is satisfied, examples of the dye according to aspects of the present invention also include dyes that exhibit oil solubility through salt formation of a water-soluble dye and a long-chain base. An example of such dyes is a salt-forming dye obtained by combining a long-chain amine with a disperse dye, a metal complex dye, an acid dye, a direct dye, or a reactive dye.

Regarding the water-insoluble low-molecular-weight dispersant according to aspects of the present invention, the solubility of the water-insoluble low-molecular-weight dispersant in the water-based solvent may be 0.3% or less by mass at room temperature (20° C.) and the solubility in the oil-based solvent may be 1.0% or more by mass at room temperature (20° C.). The inventors of the present invention have found that, in this case, the coloring particles can be satisfactorily formed particularly by the production method according to aspects of the present invention. The water-insoluble low-molecular-weight dispersant may have a molecular weight of 1000 or less. If the molecular weight is more than 1000, the viscosity of the first liquid is increased and thus the emulsifying step according to aspects of the present invention sometimes cannot be satisfactorily performed. Furthermore, since a high-molecular-weight dispersant having a molecular weight of more than 1000 cannot display sufficient mobility in the first liquid, it is difficult to apply such a dispersant in the dispersant replacing step according to aspects of the present invention.

The water-insoluble low-molecular-weight dispersant may have an HLB value of 7 or less. Herein, the HLB value is an index that indicates the balance between hydrophilicity and hydrophobicity concerning a hydrophilic group and a hydrophobic group that constitute the molecules of the dispersant. Normally, when the HLB value is 7 or less, the dispersant is insoluble in water. When the HLB value is more than 7, the interaction force between the dye and the dispersant may be decreased because the balance between hydrophilicity and hydrophobicity of the dispersant is shifted to the hydrophilic side. In the case where the interaction force between the dye and the dispersant is small, for example, when the coloring particles according to aspects of the present invention are applied as an ink composition, there may be a concern that the dispersant is desorbed due to the effect of impurities contained in the ink composition and thus the coloring particles are aggregated.

The water-insoluble low-molecular-weight dispersant according to aspects of the present invention may be an anionic dispersant or a cationic dispersant in order to impart dispersion stability to the coloring particles. An anionic dispersant may be provided because the dispersion stability of the coloring particles is improved. In the case where pH adjustment is performed in the dispersant replacing step according to aspects of the present invention, there may be employed a water-insoluble low-molecular-weight dispersant having a chargeable functional group in which the degree of dissociation varies depending on pH, such as a carboxyl group or an amine group. When such a water-insoluble low-molecular-weight dispersant is used, for example, the emulsifying step can be performed under the pH condition that the degree of dissociation is low, and the dispersant replacing step can be performed under the pH condition that the degree of dissociation is high. When the degree of dissociation of the water-insoluble low-molecular-weight dispersant is low, the viscosity of the first liquid is decreased and thus the emulsifying step can be satisfactorily performed. When the degree of dissociation of the water-insoluble low-molecular-weight dispersant is high, the affinity between the water-insoluble low-molecular-weight dispersant and the water-based solvent is improved and thus the dispersant replacing step can be efficiently performed. Examples of the water-insoluble low-molecular-weight dispersant according to aspects of the present invention include fatty acids such as lauric acid, oleic acid, and linoleic acid and aromatic carboxylic acids such as toluic acid and cinnamic acid. Obviously, the water-insoluble low-molecular-weight dispersant is not limited thereto as long as objects according to aspects of the present invention can be achieved.

The coloring particles according to aspects of the present invention may contain an ultraviolet absorber, an antiseptic, and other additives as auxiliary agents.

The coloring particles according to aspects of the present invention and the production method thereof will now be described on the basis of Examples, but aspects of the present invention are not limited thereto. Herein, "part" or "%" in Examples is on a mass basis unless otherwise specified. In addition "average particle size" is a scattering particle size based on dynamic light scattering.

EXAMPLE 1

Into 97.5 g of chloroform, 5.0 g of a dye 1 below and 2.1 g of oleic acid as a water-insoluble low-molecular-weight dispersant were added and mixed to obtain a mixed solution including the dye 1 and oleic acid dissolved therein. The mixed solution was added to 400 g of water (containing 6.0 g of sodium dodecyl sulfate, pH 6.0). Furthermore, an emulsification treatment was performed using an ultrasonic homogenizer (200 W) at 4° C. for 20 minutes to form an emulsion. The solubility parameter of the dye 1 in water with a pH of 6.0 was 9.28. According to the evaluation with DLS 8000 (available from Otsuka Electronics Co., Ltd.), this emulsion was a monodispersed emulsion having a particle size distribution with a single peak and including dispersoids whose average particle size was 680 nm.

Into the emulsion, 0.1 N aqueous sodium hydroxide solution was added to prepare an emulsion with a pH of 10.0. Herein, the solubility parameter of the dye 1 in water with a pH of 10.0 was 9.29.

Next, the pressure was reduced using an evaporator to remove chloroform from the dispersoids. After purification was performed by dialysis, the dispersoids were dispersed in distilled water again to obtain intended coloring particles 1. When the pH dependence of zeta potential of the coloring particles 1 was evaluated using ZEECOM (available from MICROTEC Co., Ltd.), an isoelectric point was observed at about pH 4.5. On the other hand, an isoelectric point was not observed for the above-described monodispersed emulsion, and it was confirmed that the zeta potential was hardly dependent on pH. According to the evaluation with DLS 8000 (available from Otsuka Electronics Co., Ltd.), the coloring particles 1 had a particle size distribution with a single peak, an average particle size of 56 nm, and a coefficient of variation of 53%. Furthermore, according to the observation with a transmission electron microscope, the average aspect ratio was 1.20.

Subsequently, the coloring particles 1 were freeze-dried to dry and harden color material particles. After the coloring particles 1 were dissolved in chloroform, the absorbance measurement was performed to evaluate the maximum absorption wavelength and the absorbance. This absorbance was compared with a calibration curve obtained through the absorbance measurement of chloroform solutions of the dye 1 prepared at predetermined concentrations to measure the ratio of the content of the dye 1 in the coloring particles 1 to the content of oleic acid serving as a water-insoluble low-molecular-weight dispersant.

As a result, (content of dye 1 in coloring particles 1)/(content of water-insoluble low-molecular-weight dispersant in coloring particles 1)=71/29, which was larger than 3/2.

Dye 1

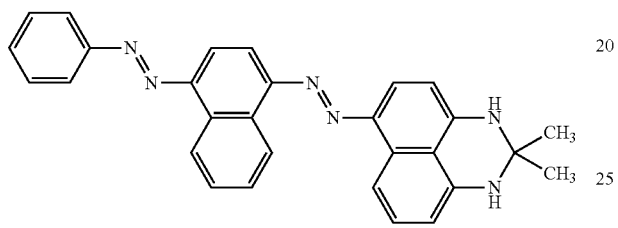

EXAMPLE 2

Into 97.5 g of chloroform, 5.0 g of a dye 2 below and 3.0 g of palmitic acid as a water-insoluble low-molecular-weight dispersant were added and mixed to obtain a mixed solution including the dye 2 and palmitic acid dissolved therein. The mixed solution was added to 400 g of water (containing 6.0 g of sodium dodecyl sulfate, pH 6.0). Furthermore, an emulsification treatment was performed using an ultrasonic homogenizer (200 W) at 4° C. for 20 minutes to form an emulsion. The solubility parameter of the dye 2 in water with a pH of 6.0 was 9.55. According to the evaluation with DLS 8000 (available from Otsuka Electronics Co., Ltd.), this emulsion was a monodispersed emulsion having a particle size distribution with a single peak and including dispersoids whose average particle size was 655 nm.

Into the emulsion, 0.1 N aqueous sodium hydroxide solution was added to prepare an emulsion with a pH of 10.0. Herein, the solubility parameter of the dye 2 in water with a pH of 10.0 was 9.55.

Next, through a dialysis process, sodium dodecyl sulfate was removed from the emulsion with a pH of 10.0 while at the same time part of chloroform was removed from the dispersoids. Furthermore, the pressure was reduced using an evaporator to remove chloroform from the dispersoids. After purification was performed by ultrafiltration, the dispersoids were dispersed in distilled water again to obtain intended coloring particles 2. When the pH dependence of zeta potential of the coloring particles 2 was evaluated using ZEECOM (available from MICROTEC Co., Ltd.), an isoelectric point was observed at about pH 4.5. On the other hand, an isoelectric point was not observed for the above-described monodispersed emulsion, and it was confirmed that the zeta potential was hardly dependent on pH. According to the evaluation with DLS 8000 (available from Otsuka Electronics Co., Ltd.), the coloring particles 2 had a particle size distribution with a single peak, an average particle size of 47 nm, and a coefficient of variation of 52%. Furthermore, according to the observation with a transmission electron microscope, the average aspect ratio was 1.20.

Subsequently, the coloring particles 2 were freeze-dried to dry and harden color material particles. After the coloring particles 2 were dissolved in chloroform, the absorbance measurement was performed to evaluate the maximum absorption wavelength and the absorbance. This absorbance was compared with a calibration curve obtained through the absorbance measurement of chloroform solutions of the dye 2 prepared at predetermined concentrations to measure the ratio of the content of the dye 2 in the coloring particles 2 to the content of palmitic acid serving as a water-insoluble low-molecular-weight dispersant.

As a result, (content of dye 2 in coloring particles 2)/(content of water-insoluble low-molecular-weight dispersant in coloring particles 2)=31/19, which was larger than 3/2.

Dye 2

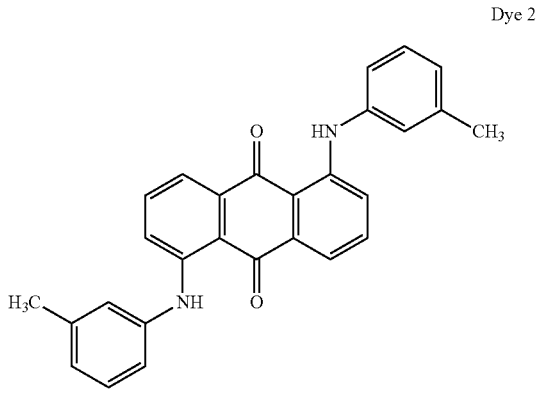

EXAMPLE 3

Into 97.5 g of chloroform, 6.0 g of Solvent Blue 97 (dye 3) and 2.0 g of oleic acid as a water-insoluble low-molecular-weight dispersant were added and mixed to obtain a mixed solution including the dye 3 and oleic acid dissolved therein. The mixed solution was added to 400 g of water (containing 6.0 g of sodium dodecyl sulfate, pH 6.0). Furthermore, an emulsification treatment was performed using an ultrasonic homogenizer (200 W) at 4° C. for 20 minutes to form an emulsion. The solubility parameter of the dye 3 in water with a pH of 6.0 was 12.06. According to the evaluation with DLS 8000 (available from Otsuka Electronics Co., Ltd.), this emulsion was a miniemulsion having a particle size distribution with a single peak and including dispersoids whose average particle size was 860 nm.

Into the emulsion, 0.1 N aqueous sodium hydroxide solution was added to prepare an emulsion with a pH of 10.0. Herein, the solubility parameter of the dye 3 in water with a pH of 10.0 was 12.06.

Next, through a dialysis process, sodium dodecyl sulfate was removed from the emulsion with a pH of 10.0 while at the same time part of chloroform was removed from the dispersoids. Furthermore, the pressure was reduced using an evaporator to remove chloroform from the dispersoids. After purification was performed by ultrafiltration, the dispersoids were dispersed in distilled water again to obtain intended coloring particles 3. When the pH dependence of zeta potential of the coloring particles 3 was evaluated using ZEECOM (available from MICROTEC Co., Ltd.), an isoelectric point was observed at about pH 4.5. On the other hand, an isoelectric point was not observed for the above-described monodispersed emulsion, and it was confirmed that the zeta potential was hardly dependent on pH. According to the evaluation with DLS 8000 (available from Otsuka Electronics Co., Ltd.), the coloring particles 3 had a particle size distribution with a single peak, an average particle size of 78 nm, and a coefficient of variation of 56%. Furthermore, according to the observation with a transmission electron microscope, the average aspect ratio was 1.15.

Subsequently, the coloring particles 3 were freeze-dried to dry and harden color material particles. After the coloring particles 3 were dissolved in chloroform, the absorbance measurement was performed to evaluate the maximum absorption wavelength and the absorbance. This absorbance was compared with a calibration curve obtained through the absorbance measurement of chloroform solutions of the dye 3 prepared at predetermined concentrations to measure the ratio of the content of the dye 3 in the coloring particles 3 to the content of oleic acid serving as a water-insoluble low-molecular-weight dispersant.

As a result, (content of dye 3 in coloring particles 3)/(content of water-insoluble low-molecular-weight dispersant in coloring particles 3)=3/1, which was larger than 3/2.

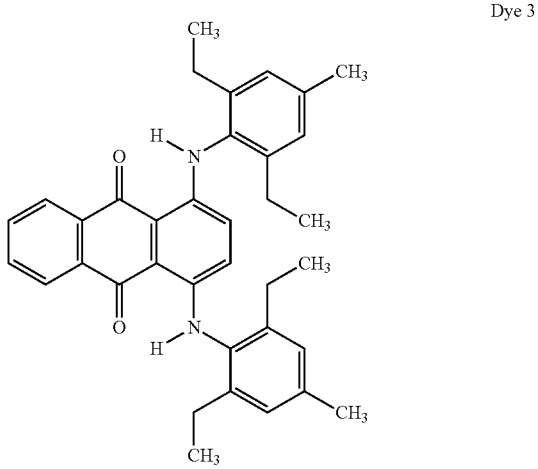

Dye 3

EXAMPLE 4

Into 95 g of chloroform, 5.0 g of Solvent Blue 97 (dye 3) and 3.0 g of oleic acid as a water-insoluble low-molecular-weight dispersant were added and mixed to obtain a mixed solution including the dye 3 and oleic acid dissolved therein. The mixed solution was added to 400 g of water (containing 8.0 g of sodium dodecyl sulfate, pH 6.0). Furthermore, an emulsification treatment was performed using an ultrasonic homogenizer (200 W) at 4° C. for 10 minutes to form an emulsion. The solubility parameter of the dye 3 in water with a pH of 6.0 was 12.06. According to the evaluation with DLS 8000 (available from Otsuka Electronics Co., Ltd.), this emulsion was a monodispersed emulsion having a particle size distribution with a single peak and including dispersoids whose average particle size was 180 nm.

Into the emulsion, 0.1 N aqueous sodium hydroxide solution was added to prepare an emulsion with a pH of 10.0. Herein, the solubility parameter of the dye 3 in water with a pH of 10.0 was 12.06.

Next, through a dialysis process, sodium dodecyl sulfate was removed from the emulsion with a pH of 10.0 while at the same time part of chloroform was removed from the dispersoids. Furthermore, the pressure was reduced using an evaporator to remove chloroform from the dispersoids. After purification was performed by ultrafiltration, the dispersoids were dispersed in distilled water again to obtain intended coloring particles 4. When the pH dependence of zeta potential of the coloring particles 4 was evaluated using ZEECOM (available from MICROTEC Co., Ltd.), an isoelectric point was observed at about pH 4.5. On the other hand, an isoelectric point was not observed for the above-described monodispersed emulsion, and it was confirmed that the zeta potential was hardly dependent on pH. According to the evaluation with DLS 8000 (available from Otsuka Electronics Co., Ltd.), the coloring particles 4 had a particle size distribution with a single peak, an average particle size of 18 nm, and a coefficient of variation of 52%. Furthermore, according to the observation with a transmission electron microscope, the average aspect ratio was 1.20.

Subsequently, the coloring particles 4 were dried and hardened by freeze-drying. After the coloring particles 4 were dissolved in chloroform, the absorbance measurement was performed to evaluate the maximum absorption wavelength and the absorbance. This absorbance was compared with a calibration curve obtained through the absorbance measurement of chloroform solutions of the dye 3 prepared at predetermined concentrations to measure the ratio of the content of the dye 3 in the coloring particles 4 to the content of oleic acid serving as a water-insoluble low-molecular-weight dispersant.

As a result, (content of dye 3 in coloring particles 4)/(content of water-insoluble low-molecular-weight dispersant in coloring particles 4)=65/41, which was larger than 3/2.

EXAMPLE 5

Into 97.5 g of chloroform, 7.0 g of Solvent Blue 97 (dye 3) and 2.2 g of oleic acid as a water-insoluble low-molecular-weight dispersant were added and mixed to obtain a mixed solution including the dye 3 and oleic acid dissolved therein. The mixed solution was added to 400 g of water (containing 7.0 g of sodium dodecyl sulfate, pH 6.0). Furthermore, an emulsification treatment was performed using an ultrasonic homogenizer (200 W) at 4° C. for 20 minutes to form an emulsion. The solubility parameter of the dye 3 in water with a pH of 6.0 was 12.06. According to the evaluation with DLS 8000 (available from Otsuka Electronics Co., Ltd.), this emulsion was a monodispersed emulsion having a particle size distribution with a single peak and including dispersoids whose average particle size was 810 nm.

Into the emulsion, 0.1 N aqueous sodium hydroxide solution was added to prepare an emulsion with a pH of 10.0. Herein, the solubility parameter of the dye 3 in water with a pH of 10.0 was 12.06.

Next, through a dialysis process, sodium dodecyl sulfate was removed from the emulsion with a pH of 10.0 while at the same time part of chloroform was removed from the dispersoids. Furthermore, the pressure was reduced using an evaporator to remove chloroform from the dispersoids. After purification was performed by ultrafiltration, the dispersoids were dispersed in distilled water again to obtain intended coloring particles 5. When the pH dependence of zeta potential of the coloring particles 5 was evaluated using ZEECOM (available from MICROTEC Co., Ltd.), an isoelectric point was observed at about pH 4.5. On the other hand, an isoelectric point was not observed for the above-described monodispersed emulsion, and it was confirmed that the zeta potential was hardly dependent on pH. According to the evaluation with DLS 8000 (available from Otsuka Electronics Co., Ltd.), the coloring particles 5 had a particle size distribution with a single peak, an average particle size of 47 nm, and a coefficient of variation of 56%. Furthermore, according to the observation with a transmission electron microscope, the average aspect ratio was 1.13.

Subsequently, the coloring particles 5 were freeze-dried to dry and harden color material particles. After the coloring particles 5 were dissolved in chloroform, the absorbance measurement was performed to evaluate the maximum absorption wavelength and the absorbance. This absorbance was compared with a calibration curve obtained through the absorbance measurement of chloroform solutions of the dye 3 prepared at predetermined concentrations to measure the ratio of the content of the dye 3 in the coloring particles 5 to the content of oleic acid serving as a water-insoluble low-molecular-weight dispersant.

As a result, (content of dye 3 in coloring particles 5)/(content of water-insoluble low-molecular-weight dispersant in coloring particles 5)=19/6, which was larger than 3/2.

COMPARATIVE EXAMPLE 1

Into 97.5 g of chloroform, 5.0 g of a dye 4 below and 2.0 g of oleic acid as a water-insoluble low-molecular-weight dispersant were added and mixed to obtain a mixed solution including the dye 4 and oleic acid dissolved therein. The mixed solution was added to 400 g of water (containing 6.0 g of sodium dodecyl sulfate, pH 6.0). Furthermore, an emulsification treatment was performed using an ultrasonic homogenizer (200 W) at 4° C. for 20 minutes to form an emulsion. The solubility parameter of the dye 4 in water with a pH of 6.0 was 9.10. According to the evaluation with DLS 8000 (available from Otsuka Electronics Co., Ltd.), this emulsion was a monodispersed emulsion having a particle size distribution with a single peak and including dispersoids whose average particle size was 790 nm.

Into the emulsion, 0.1 N aqueous sodium hydroxide solution was added to prepare an emulsion with a pH of 10.0. Herein, the solubility parameter of the dye 4 in water with a pH of 10.0 was 6.75.

Next, through a dialysis process, sodium dodecyl sulfate was removed while adjusting the pH of the emulsion to be 6.0. At the same time, part of chloroform was removed from the dispersoids. Furthermore, the pressure was reduced using an evaporator to remove chloroform from the dispersoids. When the dispersoids were stored for 24 hours while being stirred, a coagulating sediment was produced and thus the dispersoids could not be dispersed again as coloring particles.

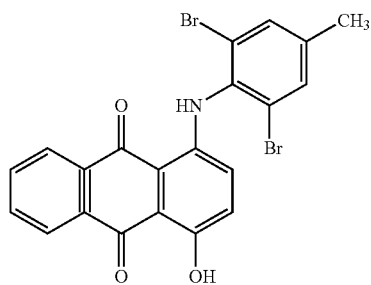

Dye 4

COMPARATIVE EXAMPLE 2

Into 97.5 g of chloroform, 5.0 g of Solvent Blue 35 (dye 5) and 2.0 g of oleic acid as a water-insoluble low-molecular-weight dispersant were added and mixed to obtain a mixed solution including the dye 5 and oleic acid dissolved therein. The mixed solution was added to 400 g of water (containing 6.0 g of sodium dodecyl sulfate, pH 11.0). Furthermore, an emulsification treatment was performed using an ultrasonic homogenizer (200 W) at 4° C. for 20 minutes to form an emulsion. The solubility parameter of the dye 5 in water with a pH of 11.0 was 8.16. According to the evaluation with DLS 8000 (available from Otsuka Electronics Co., Ltd.), this emulsion was an emulsion having a particle size distribution with multiple peaks.

Subsequently, the pressure was reduced using an evaporator to remove chloroform from the dispersoids. When the dispersoids were stored for 24 hours while being stirred, a coagulating sediment was produced and thus the dispersoids could not be dispersed again as coloring particles.

COMPARATIVE EXAMPLE 3

Into 97.5 g of chloroform, 6.0 g of Solvent Blue 97 (dye 3) and 7.2 g of oleic acid as a water-insoluble low-molecular-weight dispersant were added and mixed to obtain a mixed solution including the dye 3 and oleic acid dissolved therein. The mixed solution was added to 400 g of water (containing 6.5 g of sodium dodecyl sulfate, pH 6.0). Furthermore, an emulsification treatment was performed using an ultrasonic homogenizer (200 W) at 4° C. for 20 minutes to form an emulsion. The solubility parameter of the dye 3 in water with a pH of 6.0 was 12.06. According to the evaluation with DLS 8000 (available from Otsuka Electronics Co., Ltd.), this emulsion was a miniemulsion having a particle size distribution with a single peak and including dispersoids whose average particle size was 790 nm.

Into the emulsion, 0.1 N aqueous sodium hydroxide solution was added to prepare an emulsion with a pH of 10.0. Herein, the solubility parameter of the dye 3 in water with a pH of 10.0 was 12.06.

Next, through a dialysis process, sodium dodecyl sulfate was removed from the emulsion with a pH of 10.0 while at the same time part of chloroform was removed from the dispersoids. Furthermore, the pressure was reduced using an evaporator to remove chloroform from the dispersoids. After purification was performed by ultrafiltration, the dispersoids were dispersed in distilled water again to obtain intended coloring particles 6. When the pH dependence of zeta potential of the coloring particles 6 was evaluated using ZEECOM (available from MICROTEC Co., Ltd.), an isoelectric point was observed at about pH 4.5. On the other hand, an isoelectric point was not observed for the above-described monodispersed emulsion, and it was confirmed that the zeta potential was hardly dependent on pH. According to the evaluation with DLS 8000 (available from Otsuka Electronics Co., Ltd.), the coloring particles 6 had a particle size distribution with a single peak, an average particle size of 76 nm, and a coefficient of variation of 58%. Furthermore, according to the observation with a transmission electron microscope, the average aspect ratio was 1.13.

Subsequently, the coloring particles 6 were freeze-dried to dry and harden color material particles. After the coloring particles 6 were dissolved in chloroform, the absorbance measurement was performed to evaluate the maximum absorption wavelength and the absorbance. This absorbance was compared with a calibration curve obtained through the absorbance measurement of chloroform solutions of the dye 3 prepared at predetermined concentrations to measure the ratio of the content of the dye 3 in the coloring particles 6 to the content of oleic acid serving as a water-insoluble low-molecular-weight dispersant.

As a result, (content of dye 3 in coloring particles 6)/(content of water-insoluble low-molecular-weight dispersant in coloring particles 6)=6/7.

COMPARATIVE EXAMPLE 4

Into 97.5 g of chloroform, 5.0 g of Solvent Blue 97 (dye 3) and 2.0 g of oleic acid as a water-insoluble low-molecular-weight dispersant were added and mixed to obtain a mixed solution including the dye 3 and oleic acid dissolved therein. The mixed solution was added to 400 g of water (containing 1.0 g of sodium dodecyl sulfate, pH 6.0). Furthermore, an emulsification treatment was performed using an ultrasonic homogenizer (200 W) at 4° C. for 20 minutes to form an emulsion. The solubility parameter of the dye 3 in water with a pH of 6.0 was 12.06. However, according to the evaluation with DLS 8000 (available from Otsuka Electronics Co., Ltd.), this emulsion had a particle size distribution with multiple peaks and poor dispersion stability. Therefore, the average particle size of the emulsion could not be determined.

Into the emulsion, 0.1 N aqueous sodium hydroxide solution was added to prepare an emulsion with a pH of 10.0. Herein, the solubility parameter of the dye 3 in water with a pH of 10.0 was 12.06.

Next, through a dialysis process, sodium dodecyl sulfate was removed from the emulsion with a pH of 10.0 while at the same time part of chloroform was removed from the dispersoids. Furthermore, the pressure was reduced using an evaporator to remove chloroform from the dispersoids. After purification was performed by ultrafiltration, the dispersoids were dispersed in distilled water again. Since a dispersed substance and an aggregate were simultaneously produced, the aggregate was filtered and only the dispersed substance was isolated to obtain intended coloring particles 7. When the pH dependence of zeta potential of the coloring particles 7 was evaluated using ZEECOM (available from MICROTEC Co., Ltd.), an isoelectric point was observed at about pH 4.5. On the other hand, an isoelectric point was not observed for the above-described monodispersed emulsion, and it was confirmed that the zeta potential was hardly dependent on pH. According to the evaluation with DLS 8000 (available from Otsuka Electronics Co., Ltd.), the coloring particles 7 had a particle size distribution with a single broad peak, an average particle size of 92 nm, and a coefficient of variation of 66%. Furthermore, according to the observation with a transmission electron microscope, the average aspect ratio was 1.18.

Subsequently, the coloring particles 7 were freeze-dried to dry and harden color material particles. After the coloring particles 7 were dissolved in chloroform, the absorbance measurement was performed to evaluate the maximum absorption wavelength and the absorbance. This absorbance was compared with a calibration curve obtained through the absorbance measurement of chloroform solutions of the dye 3 prepared at predetermined concentrations to measure the ratio of the content of the dye 3 in the coloring particles 7 to the content of oleic acid serving as a water-insoluble low-molecular-weight dispersant.

As a result, (content of dye 3 in coloring particles 7)/(content of water-insoluble low-molecular-weight dispersant in coloring particles 7)=71/29.

Table 1 shows the results of Examples and Comparative Examples all together.

TABLE 1

|  | Coloring particles | Dye | Solubility parameter of dye | | | | Average particle size of dispersoids <nm> | Average particle size of coloring particles <nm> | Dye/dispersant (mass ratio) |
| --- | --- | --- | --- | --- | --- | --- | --- | --- | --- |
|  |  |  | Water pH | Parameter | Water pH | Parameter |  |  |  |
| Ex. 1 | 1 | 1 | 6.0 | 9.28 | 10.0 | 9.29 | 680 | 56 | 71/29 |
| Ex. 2 | 2 | 2 | 6.0 | 9.55 | 10.0 | 9.55 | 655 | 47 | 31/19 |
| Ex. 3 | 3 | 3 | 6.0 | 12.06 | 10.0 | 12.06 | 860 | 78 | 3/1 |
| Ex. 4 | 4 | 3 | 6.0 | 12.06 | 10.0 | 12.06 | 180 | 18 | 65/41 |
| Ex. 5 | 5 | 3 | 6.0 | 12.06 | 10.0 | 12.06 | 810 | 47 | 19/6 |
| C. E. 1 | not obtained | 4 | 6.0 | 9.10 | 10.0 | 6.75 | 790 | — | — |
| C. E. 2 | not obtained | 5 | 11.0 | 8.16 | — | — | unmeasurable | — | — |
| C. E. 3 | 6 | 3 | 6.0 | 12.06 | 10.0 | 12.06 | 790 | 76 | 6/7 |
| C. E. 4 | 7 | 3 | 6.0 | 12.06 | 10.0 | 12.06 | unmeasurable | 92 | 71/29 |

Ex.: Example
C. E.: Comparative Example

<Evaluation of Image Density>

The coloring particles 6 were added to an aqueous solution containing water and glycerin to prepare an ink composition 1 having a dye content of 5% and a glycerin content of 20%. In addition, the coloring particles 3 were added to an aqueous solution containing water and glycerin to prepare an ink composition 2 having a dye content of 5% and a glycerin content of 20%.

With the ink compositions 1 and 2, print images were formed using a piezoelectric inkjet printer (PX-V630 available from SEIKO EPSON CORPORATION) and evaluated through visual inspection. Consequently, the print image formed of the ink composition 2 was definitely clear and had high image density compared with the print image formed of the ink composition 1.

<Evaluation of Scratch Resistance of Image>

The coloring particles 3, the coloring particles 5, and the coloring particles 7 were respectively added to aqueous solutions containing water and glycerin to prepare an ink composition 3, an ink composition 4, and an ink composition 5 each having a dye content of 5% and a glycerin content of 20%.

With the ink compositions 3, 4, and 5, print images were formed using a piezoelectric inkjet printer (PX-V630 available from SEIKO EPSON CORPORATION). A test for scratch resistance was performed by tracing the print images with a finger one minute and one hour after the formation. The results were evaluated on the basis of the following criteria.

A: Tailing of an ink is not observed on either of the print image after one minute or one hour.
B: Tailing of an ink is not observed on the print image after one hour, but tailing is slightly observed on the print image after one minute.
C: Tailing of an ink is observed on both the print images after one minute and one hour.

Table 2 shows the results all together.

TABLE 2

|  | Coloring particles | Dye | Average particle size of coloring particles <nm> | Scratch resistance |
|---|---|---|---|---|
| Ink composition 3 | 3 | 3 | 78 | B |
| Ink composition 4 | 5 | 3 | 47 | A |
| Ink composition 5 | 7 | 3 | 92 | C |

It was confirmed that the scratch resistance of the print image was dependent on the average particle size of the coloring particles, and the scratch resistance was good when the average particle size was 80 nm or less and excellent when the average particle size was 50 nm or less.

According to aspects of the present invention, there can be provided fine coloring particles having good monodispersibility. There can also be provided an ink composition that can form a recorded image with high image density and good scratch resistance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of International Patent Application No. PCT/JP2010/055697, filed Mar. 30, 2010, which is hereby incorporated by reference herein in its entirety.

The invention claimed is:

1. Coloring particles comprising:
 a dye and a water-insoluble low-molecular-weight dispersant,
 wherein the average particle size of the coloring particles is 10 nm or more and 80 nm or less; the dispersant is selected from the group consisting of lauric acid, oleic acid, linoleic acid, toluic acid, cinnamic acid, and palmitic acid; the solubility parameter of the dye in water with a pH of 6.0 to 10.0 is 9.20 or more, the solubility parameter being represented by formula (1) below; and the content of the dye and the content of the water-insoluble low-molecular-weight dispersant satisfy a relationship of formula (2) below on a mass basis $$\text{Solubility parameter} = \log(1/(\text{aqueous solubility of dye} <\text{mol/L}>)) \quad \text{Formula (1)}$$

$$3/2 \leq (\text{Content of dye in coloring particles})/(\text{Content of water-insoluble low-molecular-weight dispersant in coloring particles}). \quad \text{Formula (2)}$$

2. The coloring particles according to claim 1, wherein the coefficient of variation in the average particle size of the coloring particles is 60% or less.

3. The coloring particles according to claim 1, wherein the average aspect ratio of the coloring particles is 1.00 or more and 1.20 or less.

4. The coloring particles according to claim 1, wherein the water-insoluble low-molecular-weight dispersant has a molecular weight of 1000 or less.

5. An ink composition comprising the coloring particles according to claim 1.

6. A method for producing coloring particles containing a dye and a water-insoluble low-molecular-weight dispersant, the method comprising:
 an emulsifying step of emulsifying a first liquid obtained by mixing a dye, a water-insoluble low-molecular-weight dispersant, and an oil-based solvent and a second liquid containing a water-soluble dispersant and a water-based solvent to obtain an emulsion having dispersoids that contain the first liquid and are dispersed using the water-soluble dispersant;
 a dispersant replacing step of replacing the water-soluble dispersant that is dispersing the dispersoids with the water-insoluble low-molecular-weight dispersant by desorbing the water-soluble dispersant from surfaces of the dispersoids; and
 a removing step of removing the oil-based solvent from the dispersoids,
 wherein the dispersant is selected from the group consisting of lauric acid, oleic acid, linoleic acid, toluic acid, cinnamic acid, and palmitic acid, the solubility parameter of the dye in water with a pH of 6.0 to 10.0 is 9.20 or more, the solubility parameter being represented by formula (1) below, and the content of the dye and the content of the water-insoluble low-molecular-weight dispersant satisfy a relationship of formula (2) below on a mass basis $$\text{Solubility parameter} = \log(1/(\text{aqueous solubility of dye} <\text{mol/L}>)) \quad \text{Formula (1)}$$

$$3/2 \leq (\text{Content of dye in coloring particles})/(\text{Content of water-insoluble low-molecular-weight dispersant in coloring particles}). \quad \text{Formula (2)}$$

* * * * *